(12) United States Patent
Myers et al.

(10) Patent No.: US 10,982,875 B2
(45) Date of Patent: Apr. 20, 2021

(54) RF ANTENNA POSITIONING TECHNIQUES

(71) Applicant: Standard Euler, Inc., Albany, CA (US)

(72) Inventors: Daniel Myers, Albany, CA (US); Kenny Tay, San Francisco, CA (US)

(73) Assignee: STANDARD EULER, INC., San Francisco, CA (US)

( * ) Notice: Subject to any disclaimer, the term of this patent is extended or adjusted under 35 U.S.C. 154(b) by 193 days.

(21) Appl. No.: 16/101,554

(22) Filed: Aug. 13, 2018

(65) Prior Publication Data

US 2019/0049143 A1 Feb. 14, 2019

Related U.S. Application Data

(60) Provisional application No. 62/544,876, filed on Aug. 13, 2017.

(51) Int. Cl.
| | |
|---|---|
| *F24F 11/30* | (2018.01) |
| *F24F 13/08* | (2006.01) |
| *H04B 1/48* | (2006.01) |
| *F24F 11/50* | (2018.01) |
| *F24F 13/20* | (2006.01) |
| *F24F 13/32* | (2006.01) |
| *F24F 11/49* | (2018.01) |
| *F24F 11/56* | (2018.01) |

(52) U.S. Cl.
CPC ............ *F24F 13/082* (2013.01); *F24F 11/30* (2018.01); *F24F 11/49* (2018.01); *F24F 11/50* (2018.01); *F24F 11/56* (2018.01); *F24F 13/20* (2013.01); *F24F 13/32* (2013.01); *H04B 1/48* (2013.01)

(58) Field of Classification Search
CPC .......... F24F 13/082; F24F 11/50; F24F 11/49; F24F 11/30; F24F 11/56; F24F 13/20; F24F 13/32; H04B 1/48
USPC ................................ 454/367, 333, 264, 265
See application file for complete search history.

(56) References Cited

U.S. PATENT DOCUMENTS

| | | | | |
|---|---|---|---|---|
| 8,086,352 B1 * | 12/2011 | Elliott | ..................... | G05B 15/02 700/277 |
| 10,281,937 B2 * | 5/2019 | Barrett | ..................... | F24F 11/76 |
| 2004/0067731 A1 * | 4/2004 | Brinkerhoff | ............ | F24F 13/06 454/325 |
| 2004/0166797 A1 * | 8/2004 | Thrasher | ................... | F24F 11/62 454/290 |
| 2007/0298706 A1 * | 12/2007 | Hudon | ..................... | F24F 11/74 454/256 |
| 2009/0101726 A1 * | 4/2009 | Rankich | ................... | F24F 11/30 236/51 |

* cited by examiner

*Primary Examiner* — Kenneth J Hansen
*Assistant Examiner* — Ryan L Faulkner
(74) *Attorney, Agent, or Firm* — McDonnell Boehnen Hulbert & Berghoff LLP

(57) ABSTRACT

An example heating, ventilation, and air conditioning (HVAC) vent includes a front surface, an RF module, and an antenna coupled to the RF module. The front surface is configured to direct air flowing through the HVAC vent into a room, and includes an antenna opening. The RF module is configured to wirelessly transmit or wirelessly receive a communication signal. A portion of the antenna protrudes through the antenna opening and beyond a plane of the front surface.

14 Claims, 4 Drawing Sheets

RF ANTENNA POSITIONING TECHNIQUES

CROSS-REFERENCED TO RELATED APPLICATIONS

This application claims priority to U.S. Provisional Patent Application No. 62/544,876 filed Aug. 13, 2017, the entirety of which is hereby incorporated by reference.

FIELD

The present disclosure relates to ventilation equipment, and more specifically, to integrating antennas into ventilation equipment in a manner that facilitates radio frequency (RF) propagation.

BACKGROUND

In some industries, such as the heating, ventilation, and air conditioning (HVAC) industry, equipment is made of sheet metal or other types of metal that are not compatible with RF communications. One example of this is an HVAC vent, often called a register, which can be made of sheet metal and placed at the end of a metal duct to allow air to enter or leave ductwork. It is advantageous to use metal for HVAC or other vents for a number of reasons, including but not limited to: established industry convention, durability, strength to weight ratio, strength to size ratio, metal-finishing robustness, and ability to maintain finish and color. However, an HVAC vent and ductwork may poorly transmit RF communication signals, making RF communications to and/or from the HVAC vent difficult or impossible.

SUMMARY

Example embodiments are described herein. In one example aspect, a metal HVAC vent is disclosed. The metal HVAC vent includes a front surface, an RF module, and an antenna coupled to the RF module. The front surface is configured to direct air flowing through the metal HVAC vent into a room and includes an antenna opening. The RF module is configured to wirelessly transmit or wirelessly receive a communication signal. A portion of the antenna protrudes through the antenna opening and beyond a plane of the front surface.

In another example aspect, a base for an HVAC vent is disclosed. The base includes an RF module and an antenna coupled to the RF module. The RF module is configured to wirelessly transmit or wirelessly receive a communication signal. The antenna is coupled to the RF module. Further, a portion of the antenna is held in a fixed position on the base such that, when the base is inserted in a boot and covered by a metal faceplate, the portion of the antenna protrudes intro a room through an antenna opening in the metal faceplate and is oriented in a plane that is generally parallel to a front surface of the metal faceplate.

In another example aspect, an HVAC vent is disclosed. The HVAC vent includes a front surface, an RF module, and an antenna coupled to the RF module. The front surface is configured to direct air flowing through the HVAC vent into a room, and includes an antenna opening. The RF module is configured to wirelessly transmit or wirelessly receive a communication signal. A portion of the antenna protrudes through the antenna opening and beyond a plane of the front surface.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Figure 1:
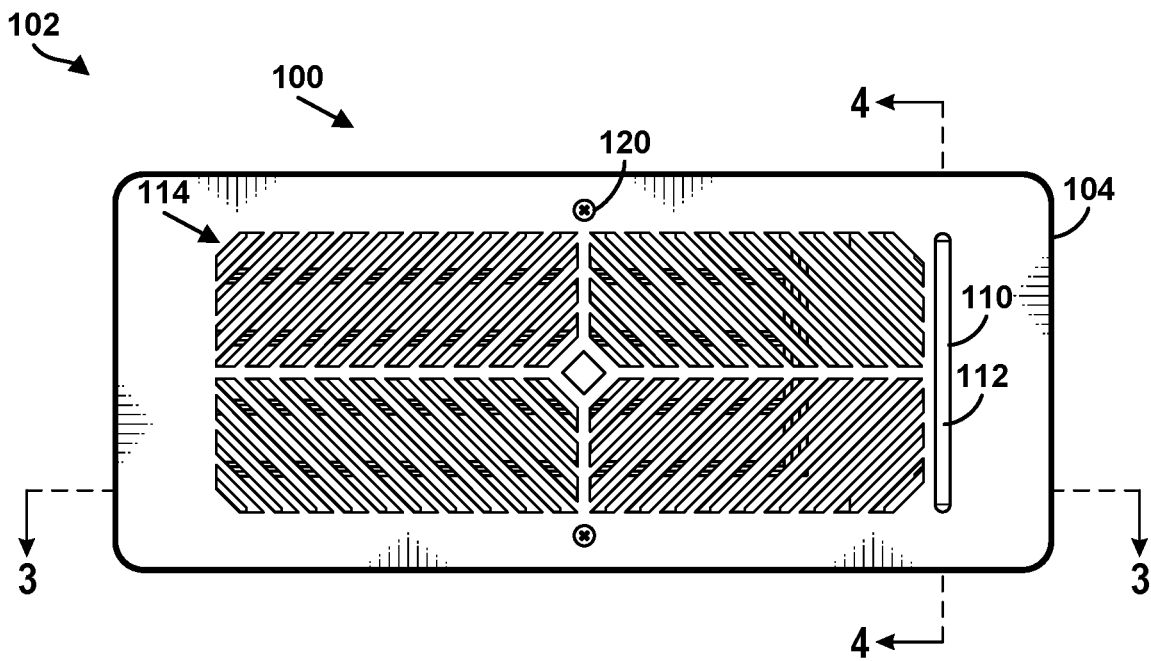
FIG. 1 illustrates a top view of an HVAC vent, in accordance with example embodiments.

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first", "second", "third", and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Because of the superior properties of metallic vents and the widespread standardization of metallic HVAC vents in industry practice, it is difficult to build automated ventilation equipment as RF communications are reflected by the HVAC vent itself and the ductwork within which the vents are placed. Ducting is typically comprised of steel or metal-lined "flex-duct" which is largely impenetrable by RF communications. In many applications, there might not be any common or practical substitutes for metal ducting. When aluminum, steel, or other metals are utilized for ductwork and/or portions of an HVAC vent, the metal materials can form an impenetrable or nearly impenetrable RF enclosure or environment.

Described herein are HVAC vents that address this and potentially other issues. An example HVAC vent includes an antenna that is positioned in a manner that allows for RF communications to and/or from an RF module located within the HVAC vent. The HVAC vent can include a front surface configured to direct air flowing through the HVAC vent into a room. For instance, the front surface may include a plurality of louvers for directing air flowing through the HVAC vent into a room. Further, the front surface can include an antenna opening, and a portion of the antenna can protrude through the antenna opening and beyond a plane of the front surface. The RF module can be coupled to the antenna and configured to wirelessly transmit and/or wirelessly receive communication signals. The communication signals could, for instance, facilitate automation or control of the HVAC vent, sensing of environmental conditions (e.g., temperature and/or pressure), or other functionality.

Advantageously, positioning the portion of the antenna such that it protrudes through the antenna opening allows the portion of the antenna to radiate energy beyond the plane of the front surface, thereby escaping the impenetrable RF enclosure, so that the RF module can communicate with other devices in the room or other nearby rooms. In some examples, the antenna can radiate energy in a hemispherical space that extends beyond the plane of the front surface. With this configuration, the RF module coupled to the antenna can receive communication signals from and/or transmit communication signals to devices that are located on any side of the HVAC vent. For instance, the RF module could receive from and/or transmit communication signals to devices that are located to the left of, to the right of, behind, or in front of the HVAC vent.

In some examples, the HVAC vent can be a metal HVAC vent. For instance, the HVAC vent can include a metal base and/or a metal front surface. Alternatively, the HVAC vent can be a non-metal HVAC vent. For example, a majority of components of the HVAC vent can be made of non-metal materials, such as plastics.

Moreover, the HVAC vents described herein provide solutions that allow for RF communication to and/or from RF modules without substantially modifying the overall profile and appearance of the front surfaces of the HVAC vents. It may be desirable to avoid substantially modifying the overall profile (e.g., raising the height) of an HVAC vent so that, if the HVAC vent is arranged in a boot on the floor of a room, the HVAC vent does not create a trip hazard for users in the room. It may be desirable to avoid modifying the appearance of the front surface of the HVAC vent, since the appearance of an antenna on an HVAC vent may be visually undesirable in a room.

Additional examples of the described systems, and associated methods, are also described hereinafter with reference to the accompanying figures.

Figure 2:
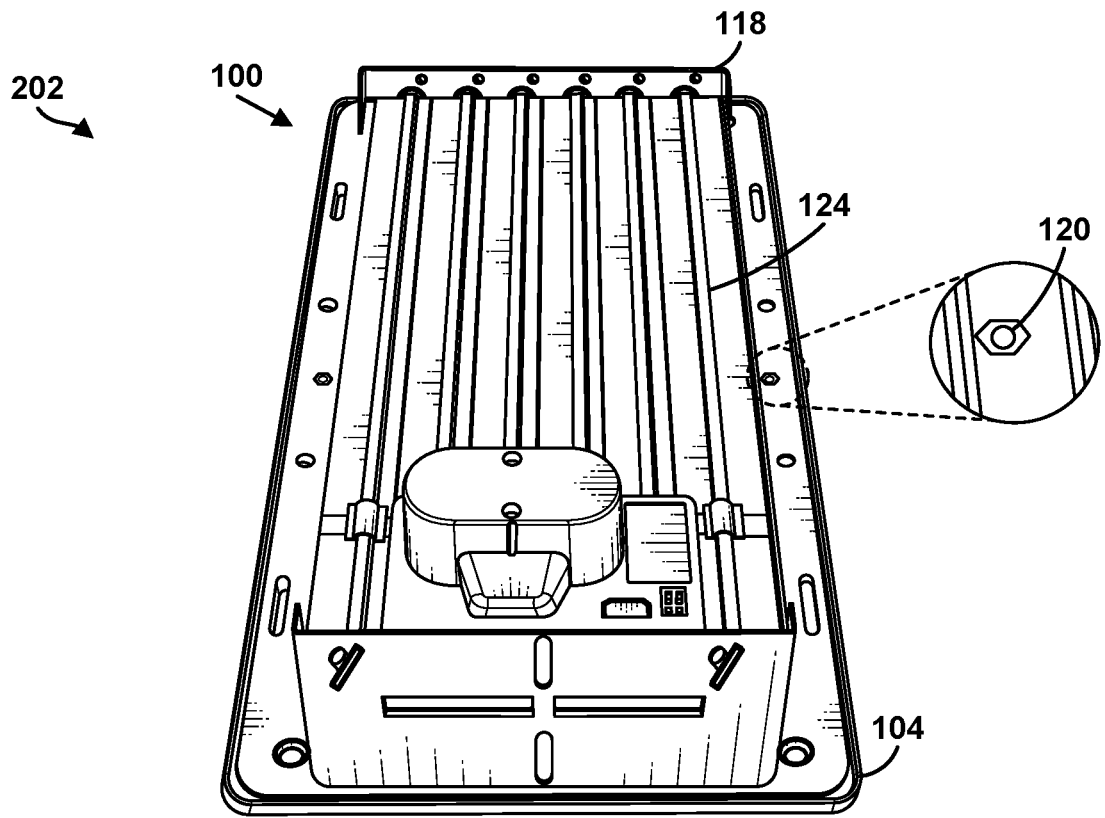
FIG. 2 illustrates a bottom view of the HVAC vent of FIG. 1.
Figure 3:
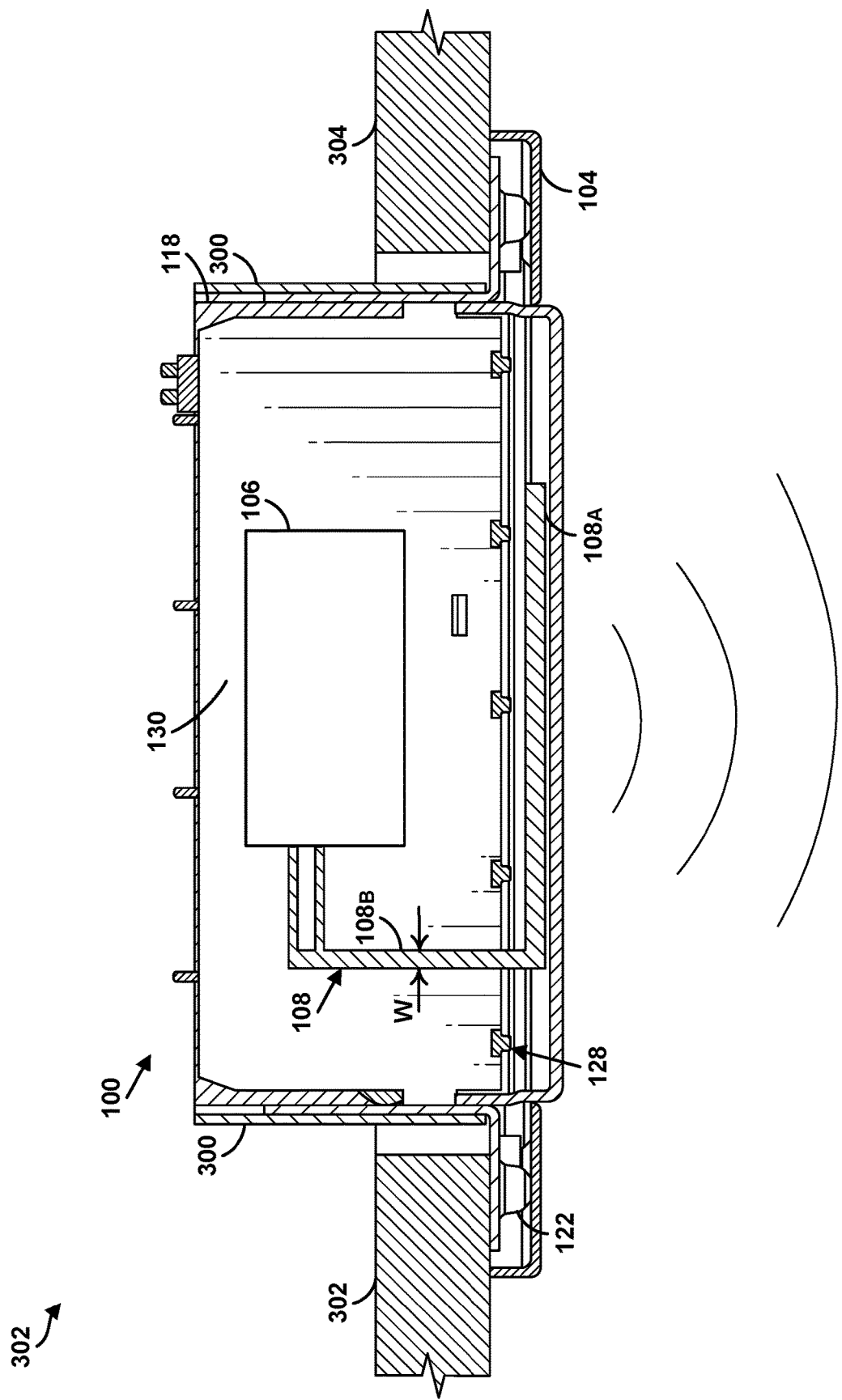
FIG. 3 illustrates a cross-sectional view of the HVAC vent of FIG. 1, shown along dotted line 3 of FIG. 1.
Figure 4:
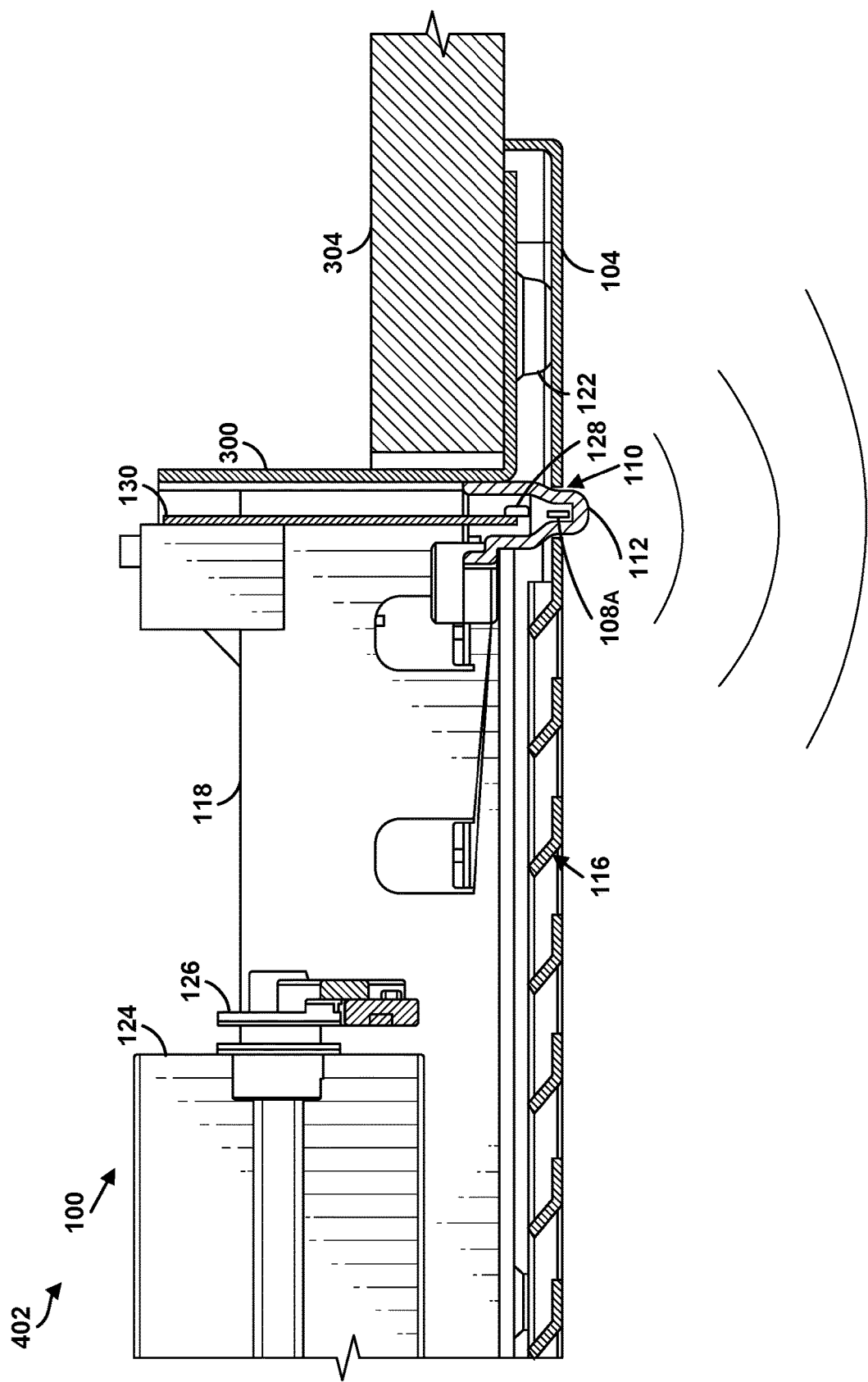
FIG. 4 illustrates a partial cross-sectional view of the HVAC vent of FIG. 1, shown along dotted line 4 of FIG. 1.

Referring now to the figures, FIGS. 1-4 illustrate an HVAC vent 100, in accordance with example embodiments. In particular, FIG. 1 illustrates a top view 102 of HVAC vent 100; FIG. 2 illustrates a bottom view 202 of HVAC vent 100; FIG. 3 illustrates a cross-sectional view 302 of HVAC vent 100, shown along dotted line 3 of FIG. 1; and FIG. 4 illustrates a partial cross-sectional view 402 of HVAC vent 100, shown along dotted line 4 of FIG. 1.

HVAC vent 100 can be used for the input or outtake of air for a room in a central heating and cooling or ventilation system. Further, HVAC vent 100 can be placed in ducting that is in floors, walls, or ceilings. FIGS. 3 and 4 show HVAC vent 100 installed within a boot 300 that is arranged within a structure 304. For instance, boot 300 can be a metal boot at the end of an HVAC duct, and structure 304 can be a floor, wall, or ceiling.

In some examples, HVAC vent 100 can be a metal HVAC vent. Metal can be advantageous as it is stronger than most alternative like plastic, it is affordable, it is durable, it is paintable, and it can be treated with surface finishes that are resistant to scratching, yellowing, and aging. In other examples, HVAC vent 100 can be a non-metal HVAC vent 100. For instance, a majority of the components of HVAC vent 100 can be made of one or more non-metals, such as plastic.

As shown in FIGS. 1-4, HVAC vent 100 can include, among other things, a front surface 104, an RF module 106, and an antenna 108 coupled to RF module 106.

Front surface 104 can include an antenna opening 110. Antenna opening 110 can include a hole in front surface 104 that allows a first portion 108a of antenna 108 to extend beyond a plane of front surface 104. First portion 108a can be oriented generally parallel to front surface 104. In some examples, first portion 108a can be a linear portion. In another examples, first portion 108a can be a non-linear (e.g., curved) portion.

The hole in front surface 104 can be a linear hole that extends along front surface 104. For instance, the hole can include a length that is similar to a length of first portion 108a. Alternatively, the hole in front surface 104 can be a smaller hole having a diameter that is slightly larger than a width W of a second portion 108b of antenna 108. With this arrangement, second portion 108b can protrude through the hole, and then first portion 108a can extend along an exterior of front surface 104. For instance, first portion 108a could extend on top of front surface 104 or within a recess formed within front surface 104. In line with the discussion above, positioning first portion 108a of antenna beyond the plane of front surface 104 can allow the antenna to radiate energy in a hemispherical space that extends beyond the plane of front surface 104.

HVAC vent 100 can also include an RF window 112 configured to hold first portion 108a of antenna in a fixed position with respect to front surface 104. RF window 112 can be a window formed of a material that is relatively transparent for RF communication signals, such as a plastic. RF window 112 can protrude through antenna opening 110 and surround first portion 108a on three sides. For instance, RF window 112 can have a partial dome shape within which first portion 108a is positioned. RF window 112 can contact one or more of the three sides of first portion 108a.

The presence of RF window 112 within antenna opening 110 can provide a fixed gap or separation between first portion 108a and front surface 104. This gap can help to improve antenna tuning and performance. For instance, holding first portion 108a in a fixed geometry relative to front surface can hold RF impedance and inductance to relatively constant values.

In some examples, RF window 112 can be relatively opaque to visible light, such that first portion 108a of antenna is not visible from a top side of front surface 104. This can improve the overall aesthetic of HVAC vent 100.

Further, front surface 104 can include an airflow opening 114 through which air can pass. Airflow opening 114, in turn, can include a plurality of louvers 116 that guide or direct air passing through airflow opening 114 in one or more directions. Airflow opening 114 can be separate from antenna opening 110.

Front surface 104 can be a faceplate that can be attached (e.g., removably attached) to a base 118. For instance, front surface 104 can be attached to base 118 using one or more fasteners 120. With this arrangement, front surface 104 can be removed from base 118 for maintenance purposes, such as to replace one or more batteries.

Base 118 can be configured to be positioned within boot 300, and faceplate can be configured to cover boot 300 and base 118. For instance, where boot is in the floor of a room, faceplate can be attached to base 118, and base 118 and faceplate can then be dropped into boot 300. Alternatively, base 118 can be attached to boot 302 using one or more fasteners 122, and then faceplate can be attached to base 118 using one or more fasteners 120.

Base 118 can also include various components, such as an adjustable damper 124 and an actuator 126 that are secured to base 118. Actuator 126 can be configured to adjust adjustable damper 124. For instance, actuator 126 can be configured to adjust adjustable damper 124 in response to receiving a control signal from a processing unit of HVAC vent 100. Adjusting adjustable damper 124 can alter the amount of air that is allowed to pass through airflow opening 114.

Base 118 can also include one or more light sources, such as one or more light-emitting diodes (LEDs) 128. RF window 112 can diffuse light emitted by one or more LEDs 128. One or more LEDs 128 can allow for optical identification at a distance. By way of example, when installing or configuring an HVAC system, there may be multiple HVAC vents in a single room or multiple HVAC vents distributed across multiple rooms. The ability of HVAC vent 100 to provide a visual indication using one or more LEDs 128 can allow a user to easily distinguish different HVAC vents from one another. For instance, when a user configures HVAC vent 100 (or at other times), a computing device may transmit an instruction to HVAC vent 100 that causes HVAC vent 100 to cause one or more LEDs 128 to illuminate. The user can then observe the illumination, and interpret the illumination to mean that HVAC vent 100 is indeed the HVAC vent being controlled or configured.

In some examples, one or more LEDs 128 can include four LEDs, and causing HVAC vent 100 to cause one or more LEDs 128 to illuminate could involve causing one or more particular LEDs of the four LEDs to illuminate, so as to provide an illumination pattern. The illumination pattern could include a first and a fourth LED being illuminated, while a second and third LED remain unilluminated. Or the illumination pattern could include the first, second, and third LEDs being illuminated, while the fourth LED remains unilluminated. Other examples are also possible.

In one example, a user can control or configure one or more functionalities of HVAC vent 100 using an application, such as a mobile application or a web-based application. A user can select HVAC vent 100 via the application on a computing device. The computing device can then transmit a message to a server. Responsive to receiving the message, the server can send a message to HVAC vent 100, with reception of the message causing one or more LEDs 128 to illuminate.

RF window 112 can therefore sometimes simultaneously serve two purposes: holding first portion 108a of antenna 108 in a fixed position relative to front surface 104; and diffusing light emitted by one or more LEDs 128. Further, using RF window 112 for both of these purposes, improves an overall aesthetic of HVAC vent 100, since RF window 112 can visually hide first portion 108a (which could be visually undesirable) from view and, at the same time, also allow light emitted by one or more LEDs 128 to pass through.

RF module 106 can include an RF receiver and/or an RF transmitter. For instance, RF module 106 can include an RF transceiver. RF module 106 can also include one or more other radio components, such as an amplifier, mixer, filter, and/or microcontroller.

RF module 106 can be configured to wirelessly receive communication signals. Additionally or alternatively, RF module 106 can be configured to wirelessly transmit communication signals. The communication signals could have a radio frequency ranging from about 3 kilohertz to about 300 gigahertz. For instance, the communication signals could have a radio frequency of 433.92 megahertz, 915 megahertz, or 2400 megahertz. Further, RF module can be configured to transmit and/or receive communication signals that comply with one or more wireless communication protocols, such as Wi-Fi, Bluetooth, Zigbee, Z-Wave etc.

Communication signals transmitted by RF module 106 could include data indicative of a temperature or pressure measured by sensors of HVAC vent 100. Communication signals transmitted by RF module 106 could also include a power level of a power source (e.g., one or more batteries) of HVAC vent 100. Communication signals received by RF module 106 could include instructions for opening or closing adjustable damper 124. Communication signals received by RF module 106 could also include instructions for causing one or more LEDs 128 to illuminate.

HVAC vent 100 can include a printed circuit board (PCB) 130, and RF module 106 can be provided on PCB 130. Part of antenna 108 can also be provided on PCB 130 such that antenna 108 and PCB 130 are co-planer. For instance, antenna 108 and PCB 130 can be located in a plane that is perpendicular to a plane of front surface 104. Further, one or more LEDs 128 can also be provided on PCB 130 and, therefore, be co-planer with PCB 130 and antenna 108.

Antenna 108 can be made of an electromagnetically conductive material, such as metal. For instance, antenna 108 can be a sheet metal antenna. Antenna 108 can take other forms as well.

Figure 5:
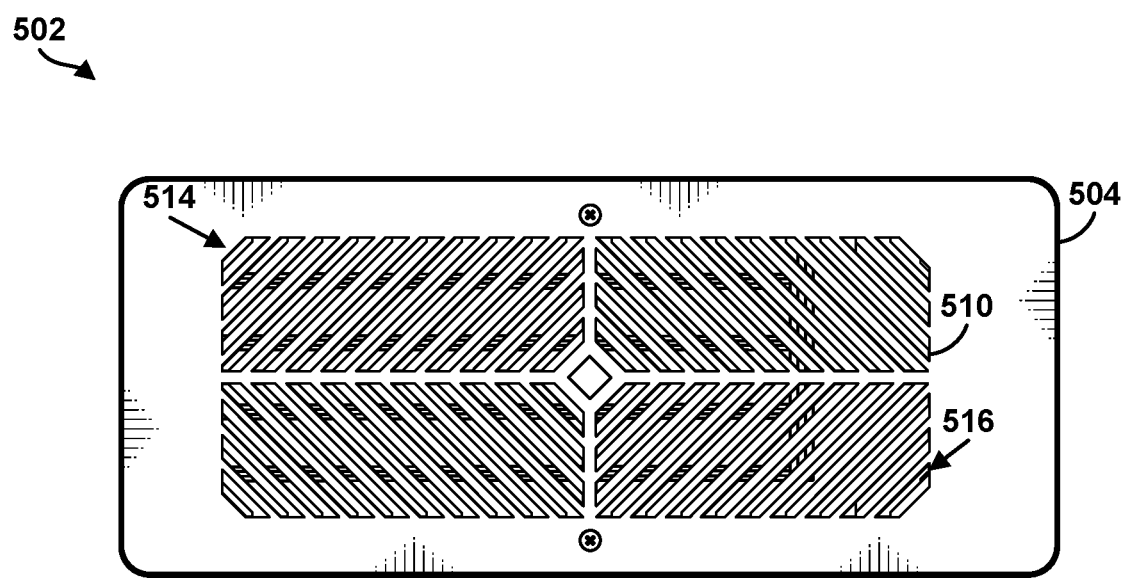
FIG. 5 illustrates a top view of another front surface, in accordance with example embodiments.

FIG. 5 illustrates a top view 502 of another front surface 504, in accordance with example embodiments. Like front surface 104 of FIGS. 1-4, front surface 504 can be part of an HVAV vent. Further, like front surface 104 of FIGS. 1-4, front surface 504 includes an airflow opening 514. Front surface 504 differs from front surface 104, however, in that front surface 504 includes an antenna opening 510 that is not separate from airflow opening 514. Rather, airflow opening 514 includes a plurality of sub-openings 516, and antenna opening 510 is one of the sub-openings of plurality of sub-openings 516. Front surface 504 can therefore be used with an HVAC vent having an antenna with a first portion that is aligned with antenna opening 510. Unlike the first portion 108a of HVAC vent 100 of FIGS. 1-4, which protrudes beyond a plane of front surface 104, an edge of the first portion of the antenna might be aligned with a plane of front surface 504. This can protect the first portion of the antenna from being damaged by an object passing over front surface 504.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A metal heating, ventilation, and air conditioning (HVAC) vent comprising:
a front surface configured to direct air flowing through the metal HVAC vent into a room, the front surface comprising an antenna opening;
a radio frequency (RF) module configured to wirelessly transmit or wirelessly receive a communication signal;
multiple light-emitting diodes (LEDs) positioned beneath the front surface and within a plane that is perpendicular to the front surface;
an antenna coupled to the RF module, wherein the antenna comprises a first, linear portion and a second portion, wherein the second portion couples the first, linear portion to the RF module, wherein the first, linear portion of the antenna protrudes through the antenna opening and beyond a plane of the front surface, and wherein the first, linear portion is positioned within the plane that is perpendicular to the front surface; and
an RF window protruding through the antenna opening, wherein the RF window surrounds the first, linear portion of the antenna on three sides, thereby visually hiding the first, linear portion of the antenna from a top side of the front surface, and is configured to diffuse light emitted by the multiple LEDs,
wherein the multiple LEDs are arranged in a linear manner and parallel to a longitudinal axis of the RF window, and
wherein the multiple LEDs are individually-controllable such that the multiple LEDs can provide multiple different illumination patterns along the longitudinal axis of the RF window.

2. The metal HVAC vent of claim 1, wherein a portion of the RF window within which the first, linear portion of the antenna is positioned is shaped as a partial dome.

3. The metal HVAC vent of claim 1, wherein the positioning of the first, linear portion of the antenna allows the antenna to wirelessly transmit or wirelessly receive the communication signal in a hemispherical space that extends beyond the plane of the front surface.

4. The metal HVAC vent of claim 1, wherein the front surface comprises an airflow opening, and wherein the antenna opening is separate from the airflow opening.

5. The metal HVAC vent of claim 4, wherein the airflow opening comprises a plurality of louvers.

6. The metal HVAC vent of claim 1, wherein the RF module is on a printed circuit board (PCB), and wherein the antenna and the PCB are co-planer.

7. The metal HVAC vent of claim 6, wherein the antenna and the PCB are oriented perpendicular to the plane of the front surface.

8. The metal HVAC vent of claim 1, further comprising:
an adjustable damper; and
an actuator configured to adjust the adjustable damper.

9. The metal HVAC vent of claim 8, wherein the adjustable damper and the actuator are secured to a base, and wherein the front surface is a faceplate that is removably attachable to the base.

10. The metal HVAC vent of claim 9, wherein the base is configured to be positioned within a boot, and wherein the faceplate is configured to cover the boot and the base.

11. The HVAC vent of claim 9, wherein the RF window is part of the base and separate from the faceplate that is removably attachable to the base.

12. A base for a heating, ventilation, and air conditioning (HVAC) vent comprising:
a radio frequency (RF) module configured to wirelessly transmit or wirelessly receive a communication signal;
an antenna coupled to the RF module, wherein the antenna comprises a first, linear portion and a second portion, wherein the second portion couples the first, linear portion to the RF module, wherein the first, linear portion of the antenna is held in a fixed position on the base such that, when the base is inserted in a boot and covered by a metal faceplate, the first, linear portion of the antenna protrudes into a room through an antenna opening in the metal faceplate and is oriented in a plane that is parallel to a front surface of the metal faceplate;
multiple light-emitting diodes (LEDs) positioned such that, when the base is inserted in the boot and covered by the metal faceplate, the multiple LEDs are beneath the metal faceplate and within a plane that is perpendicular to the metal faceplate; and
an RF window configured to protrude through the antenna opening, wherein the RF window surrounds the first, linear portion of the antenna on three sides, thereby visually hiding the first, linear portion of the antenna from a top side of the front surface, and is configured to diffuse light emitted by the multiple LEDs,
wherein the multiple LEDs are arranged in a linear manner and parallel to a longitudinal axis of the RF window, and
wherein the multiple LEDs are individually-controllable such that the multiple LEDs can provide multiple different illumination patterns along the longitudinal axis of the RF window.

13. The base of claim 12, further comprising:
an adjustable damper; and
an actuator configured to adjust the adjustable damper.

14. A heating, ventilation, and air conditioning (HVAC) vent comprising:
a front surface configured to direct air flowing through the HVAC vent into a room, the front surface comprising an antenna opening;
radio frequency (RF) module configured to wirelessly transmit or wirelessly receive a communication signal;
multiple light-emitting diodes (LEDs) positioned beneath the front surface and within a plane that is perpendicular to the front surface;
an antenna coupled to the RF module, wherein the antenna comprises a first, linear portion and a second portion, wherein the second portion couples the first, linear portion to the RF module, wherein the first, linear portion of the antenna protrudes through the antenna opening and beyond a plane of the front surface, and wherein the first, linear portion is positioned within the plane that is perpendicular to the front surface; and
an RF window protruding through the antenna opening, wherein the RF window surrounds the first, linear portion of the antenna on three sides, thereby visually hiding the first, linear portion of the antenna from a top side of the front surface, and is configured to diffuse light emitted by the multiple LEDs, wherein the multiple LEDs are arranged in a linear manner and parallel to a longitudinal axis of the RF window, and wherein the multiple LEDs are individually-controllable such that the multiple LEDs can provide multiple different illumination patterns along the longitudinal axis of the RF window.

\* \* \* \* \*